W. H. WOLFF.
TRANSPLANTING TOOL.
APPLICATION FILED SEPT. 12, 1912.
1,062,679.
Patented May 27, 1913.
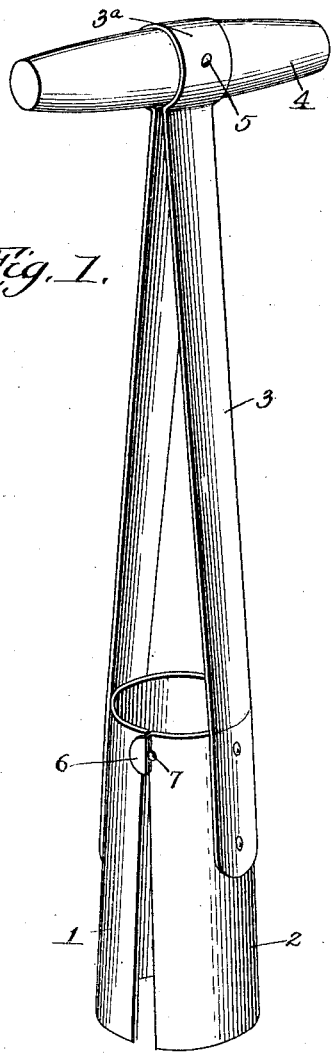
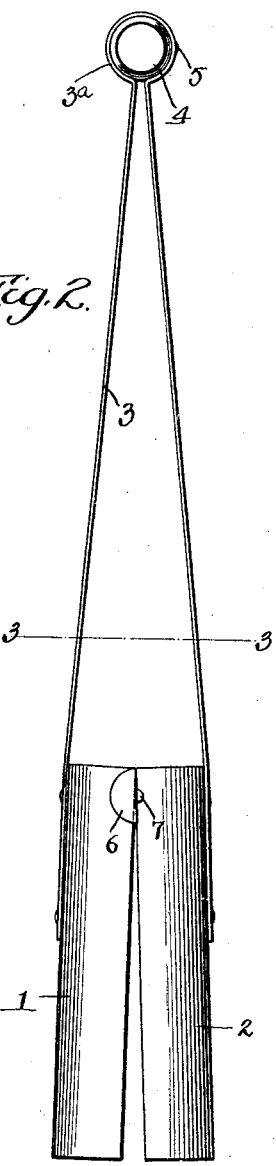
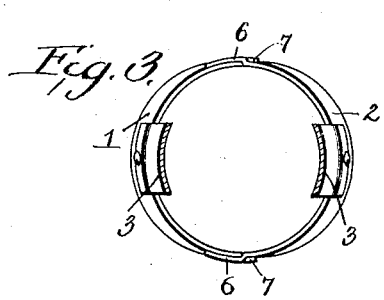
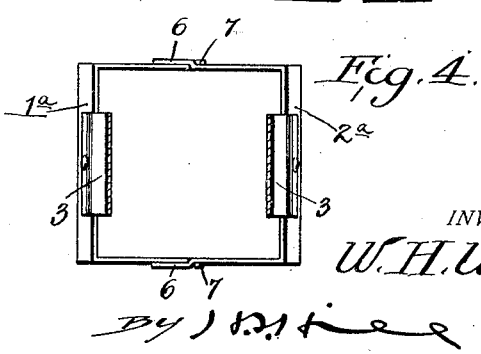
WITNESSES
INVENTOR
W. H. Wolff,
Attorney

UNITED STATES PATENT OFFICE.

WILLIAM H. WOLFF, OF NESTOR, CALIFORNIA, ASSIGNOR OF ONE-HALF TO CLYDE R. OLMSTED, OF NESTOR, CALIFORNIA.

TRANSPLANTING-TOOL.

1,062,679.  Specification of Letters Patent.  Patented May 27, 1913.

Application filed September 12, 1912. Serial No. 720,047.

*To all whom it may concern:*

Be it known that I, WILLIAM H. WOLFF, a citizen of the United States, residing at Nestor, in the county of San Diego and State of California, have invented certain new and useful Improvements in Transplanting-Tools, of which the following is a specification.

The present invention relates to certain new and useful improvements in transplanting tools such as are designed to be employed for removing young plants or seedlings from the boxes or trays in which they are grown and setting them out in beds.

Among the objects of the invention is to provide a transplanting tool of this character which is comparatively simple and inexpensive in its construction, which enables the young plants to be readily moved without unduly disturbing the roots thereof, and which is easy and convenient of manipulation.

With this and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a perspective view of a transplanting tool constructed in accordance with the invention. Fig. 2 is a side elevation of the same. Fig. 3 is a horizontal sectional view on the line 3—3 of Fig. 2, and Fig. 4 is a view similar to Fig. 3, showing a modified form of the invention which is adapted to be employed for removing young plants from square nursery boxes.

Corresponding and like parts are referred to in the following description and indicated in all the views of the drawings by the same reference characters.

Specifically describing the present embodiment of the invention, the numerals 1 and 2 designate a pair of complemental semi-cylindrical blades which are adapted to be forced down into the earth upon opposite sides of the young plant to be moved. The upper ends of the blades 1 and 2 are connected to the extremities of a spring strip 3 which is doubled upon itself and at the middle portion thereof is formed with a loop 3ª into which the handle 4 is inserted. Any suitable fastening member such as the rivet 5 may be employed for securing the handle 4 within the loop 3ª.

The upper end of the blade or jaw 2 is provided at the inner edges thereof with the outwardly offset ears 6, the offset portions of the ears being perforated to loosely receive lugs 7 which project from the edges of the blade 1. The two blades 1 and 2 are thus held against relative longitudinal movement so that both blades move together when the tool is forced into the ground during the transplanting operation. However, the two jaws can be readily sprung apart should such be necessary to release the plant, since the lugs 7 merely extend through the offset portions of the ears 6. The lower ends of the jaws or blades 1 and 2 are normally flared outwardly a slight extent, as indicated by Figs. 1 and 2, this position of the blades being due to the resilient action of the spring arms provided by the ends of the strip 3. However, when downward pressure is transmitted through the arms 3 to the outer or curved sides of the blades 1 and 2, the said pressure tends not only to force the blades down into the soil, but also to swing the lower ends of the blades together. When the transplanting tool is withdrawn, after having been thrust into the soil, the upward pull of the operator is transmitted through the arms 3 to the outer curved sides of the jaws 1 and 2 and normally tends to swing the lower ends of the jaws apart so as to release the plant. It will be obvious, however, that if necessary the jaws 1 and 2 can be sprung apart by the operator for the purpose of releasing the plant.

A slight modification is shown in Fig. 4, in which the complemental jaws 1ª and 2ª, instead of being semi-cylindrical in shape, have a square or angular formation. With jaws or blades constructed in this manner the tool can be readily employed for transplanting plants from the square boxes in which they are received from the nursery. The operation and remaining features of construction are identical with that previously described.

Having thus described the invention, what I claim as new and desire to secure by Letters Patent, is:—

1. A transplanting tool including a pair of complemental concave jaws having a loose connection with each other, a handle, and a spring strip doubled upon itself, the middle portion of the spring strip being secured to the handle while the end portions thereof are secured to the respective jaws.

2. A transplanting tool including a pair of complemental concave jaws, offset ears at the upper end of one of the jaws, said offset ears having perforations therein, lugs projecting from the opposite jaw and loosely received within the perforations of the offset ears, a handle, and spring arms projecting from the handle and secured to the jaws.

3. A transplanting tool including a pair of complemental concave jaws, offset ears projecting from the upper end of one of the jaws and having perforations therein, lugs projecting from the opposite jaw and loosely received within the said perforations, a handle, and a spring strip doubled upon itself, the intermediate portion of the spring strip being secured to the handle while the end portions thereof are secured to the upper ends of the complemental jaws at points remote from the offset ears and lugs.

In testimony whereof I affix my signature in presence of two witnesses.

WILLIAM H. WOLFF.

Witnesses:
WARNER PRAUL,
MINNIE I. PRAUL.

Copies of this patent may be obtained for five cents each, by addressing the "Commissioner of Patents, Washington, D. C."